US012608908B2

(12) United States Patent
Hai et al.

(10) Patent No.: US 12,608,908 B2
(45) Date of Patent: Apr. 21, 2026

(54) SYSTEM AND METHOD FOR DETECTION OF ROAD FEATURES BASED ON ARTIFICIAL SHADOW DATA

(71) Applicant: HERE Global B.V., Eindhoven (NL)

(72) Inventors: Yu Hai, San Diego, CA (US); Xiaoying Jin, Boulder, CO (US)

(73) Assignee: HERE Global B.V., Eindhoven (NL)

( * ) Notice: Subject to any disclaimer, the term of this patent is extended or adjusted under 35 U.S.C. 154(b) by 399 days.

(21) Appl. No.: 18/137,174

(22) Filed: Apr. 20, 2023

(65) Prior Publication Data

US 2024/0355086 A1     Oct. 24, 2024

(51) Int. Cl.
| | |
|---|---|
| *G06V 10/60* | (2022.01) |
| *G06T 7/11* | (2017.01) |
| *G06T 7/187* | (2017.01) |
| *G06T 7/40* | (2017.01) |
| *G06V 10/25* | (2022.01) |
| *G06V 10/44* | (2022.01) |

(Continued)

(52) U.S. Cl.
CPC ............... *G06V 10/60* (2022.01); *G06T 7/11* (2017.01); *G06T 7/187* (2017.01); *G06T 7/40* (2013.01); *G06V 10/25* (2022.01); *G06V 10/44* (2022.01); *G06V 20/13* (2022.01); *G06V 20/17* (2022.01); *G06T 2207/10024* (2013.01)

(58) Field of Classification Search
CPC ........ G06V 10/60; G06V 10/25; G06V 10/44; G06V 20/13; G06V 20/17; G06V 20/588; G06T 7/187; G06T 7/40
See application file for complete search history.

(56) References Cited

U.S. PATENT DOCUMENTS

| | | | | |
|---|---|---|---|---|
| 2024/0161240 A1* | 5/2024 | Zhang | .................... | G06V 10/82 |
| 2024/0193938 A1* | 6/2024 | Harikumar | ........... | G06V 20/194 |

OTHER PUBLICATIONS

Ehsan Shahrian Varnousfaderani, Wolf-Dieter Vogl, Jing Wu, Bianca S. Gerendas, Christian Simader, Georg Langs, Sebastian M. Waldstein, and Ursula Schmidt-Erfurth "Geodesic denoising for optical coherence tomography images", Proc. SPIE 9784, Medical Imaging 2016: Image Processing, 97840K Mar. 21, 2016 (Year: 2016).*

(Continued)

*Primary Examiner* — Andrew M Moyer
*Assistant Examiner* — Conor A O'Malley
(74) *Attorney, Agent, or Firm* — DITTHAVONG, STEINER & MLOTKOWSKI

(57) ABSTRACT

An approach is provided for detecting road features. The approach, for example, involves receiving image data associated with one or more road features. The received image data may be associated with ground truth label data corresponding to the one or more road features. The approach further involves determining a set of shadowed regions from one or more images of the received image data. The approach further involves generating artificial shadow data based on the determined set of shadowed regions. The approach further involves augmenting the image data with the generated artificial shadow data by applying the generated artificial shadow data to the received image data. The approach further involves training a machine learning (ML) model based on the augmented image data and the ground truth label data. The ML model is trained to detect the one or more road features.

18 Claims, 9 Drawing Sheets

(51) Int. Cl.
  *G06V 20/13* (2022.01)
  *G06V 20/17* (2022.01)

(56) References Cited

OTHER PUBLICATIONS

Quantum Machine Learning: A Hands-on Tutorial for Machine Learning Practitioners and Researchers, Yuxuan Du and Xinbiao Wang and Naixu Guo and Zhan Yu and Yang Qian and Kaining Zhang and Min-Hsiu Hsieh and Patrick Rebentrost and Dacheng Tao, 2025, 2502.01146, arXiv,https://arxiv.org/abs/2502.01146 (Year: 2025).*

H. Ghraieb, J. Viquerat, A. Larcher, P. Meliga, E. Hachem; Single-step deep reinforcement learning for two- and three-dimensional optimal shape design. AIP Advances Aug. 1, 2022; 12 (8): 085108. (Year: 2022).*

Mnih, V., Hinton, G.E. (2010). Learning to Detect Roads in High-Resolution Aerial Images. In: Daniilidis, K., Maragos, P., Paragios, N. (eds) Computer Vision—ECCV 2010. ECCV 2010. Lecture Notes in Computer Science, vol. 6316. Springer, Berlin, Heidelberg. https://doi.org/10.1007/978-3-642-15567-3_16 (Year: 2010).*

Office Action for related European Patent Application No. 24170966.6-1207, dated Sep. 19, 2024, 13 pages.

Hossain et al., "Forest fire flame and smoke detection from UAV-captured images using fire-specific color features and multi-color space local binary pattern", Journal of Unmanned Vehicle Systems, vol. 8, No. 1, Dec. 1, 2020, 45 pages.

Wang et al., "Shadow Detection and Compensation in High Resolution Satellite Image Bases on Retinex", 2009 Fifth International Conference Image and Graphics, Sep. 20, 2009, pp. 209-212.

Tokuta, "On Curved Shadow Generation by Ray Tracing in the Plane", SPIE vol. 1360 Visual Communications and Image Processing '90, Jan. 1, 1990, 5 pages.

Liu et al., "From Shadow Generation to Shadow Removal", 2021 IEEE/CVF Conference on Computer Vision and Pattern Recognition (CVPR), 10 pages.

Ufuktepe et al., "Learning-based shadow detection in aerial imagery using automatic training supervision from 3D point clouds", 2021 IEEE/CVF International Conference on Computer Vision Workshops (ICCVW), pp. 3927-3935.

Li et al., "Data augmentation and shadow image classification for shadow detection", Feb. 2022, IET Image Processing 16(8), pp. 717-728.

Inoue et al., "Learning from synthetic shadows for shadow detection and removal", IEEE Transactions on Circuits and Systems for Video Technology, 2021, 11 pages.

Hiu et al., "Revisiting shadow detection: a new benchmark dataset for complex world", IEEE Transactions on Image Processing ( vol. 30), Jan. 11, 2021, pp. 1-10.

Mazhar et al., "Random shadows and highlights: a new data augmentation method for extreme lighting conditions", Jan. 18, 2021, 5 pages.

* cited by examiner

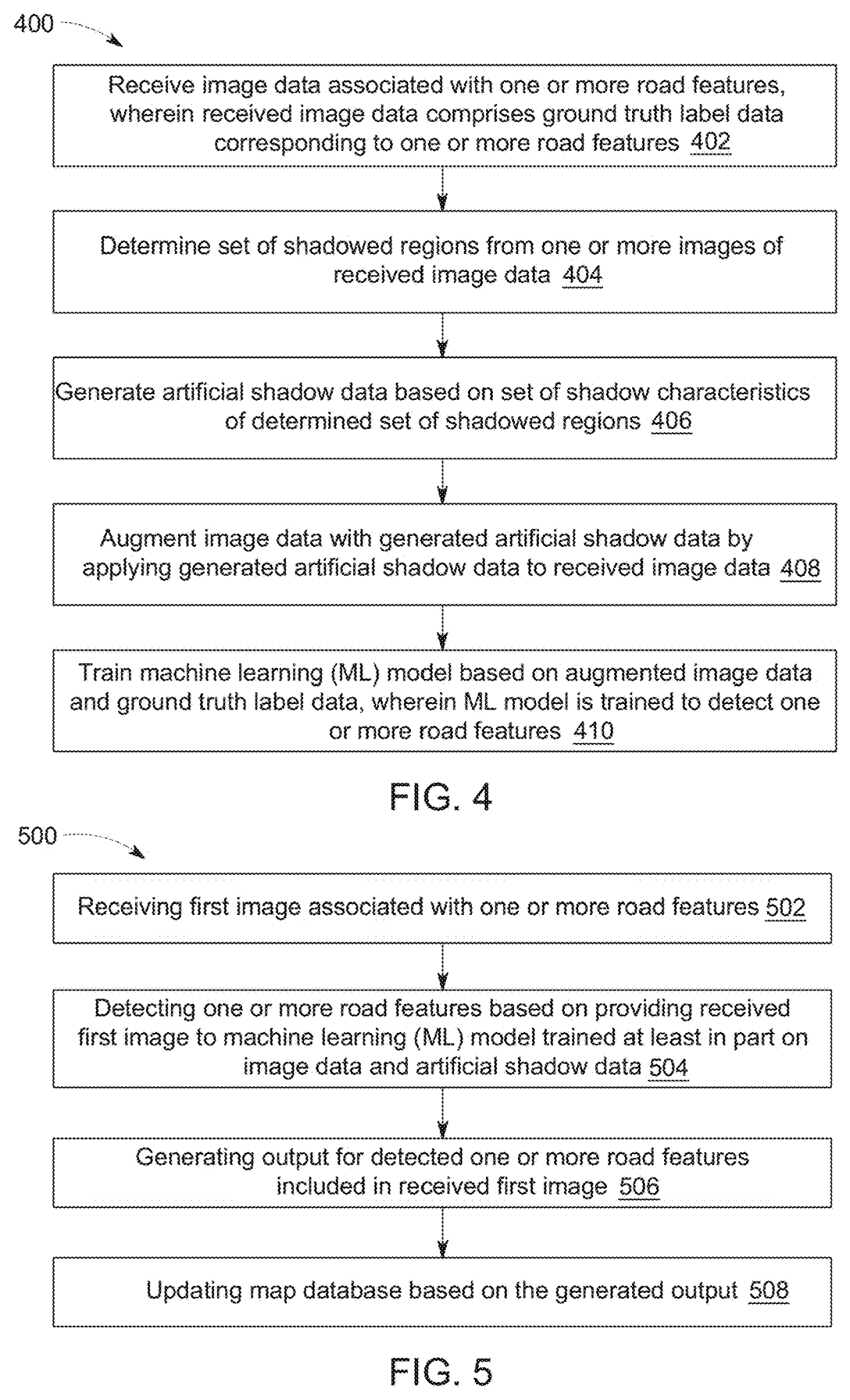

Receive image data associated with one or more road features, wherein received image data comprises ground truth label data corresponding to one or more road features 402

↓

Determine set of shadowed regions from one or more images of received image data 404

↓

Generate artificial shadow data based on set of shadow characteristics of determined set of shadowed regions 406

↓

Augment image data with generated artificial shadow data by applying generated artificial shadow data to received image data 408

↓

Train machine learning (ML) model based on augmented image data and ground truth label data, wherein ML model is trained to detect one or more road features 410

Receiving first image associated with one or more road features 502

↓

Detecting one or more road features based on providing received first image to machine learning (ML) model trained at least in part on image data and artificial shadow data 504

↓

Generating output for detected one or more road features included in received first image 506

↓

Updating map database based on the generated output 508

FIG. 5

600
602
602a
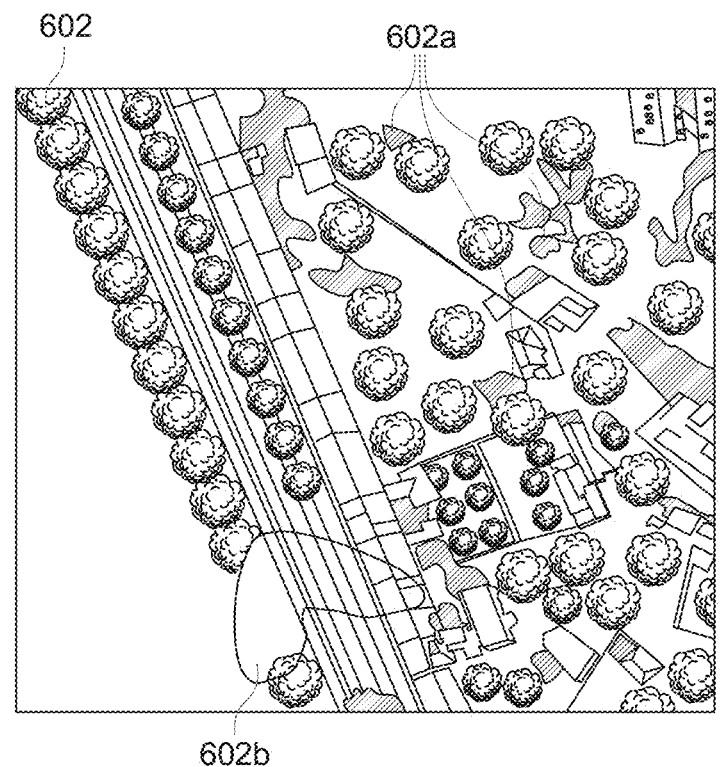
602b
604  604b
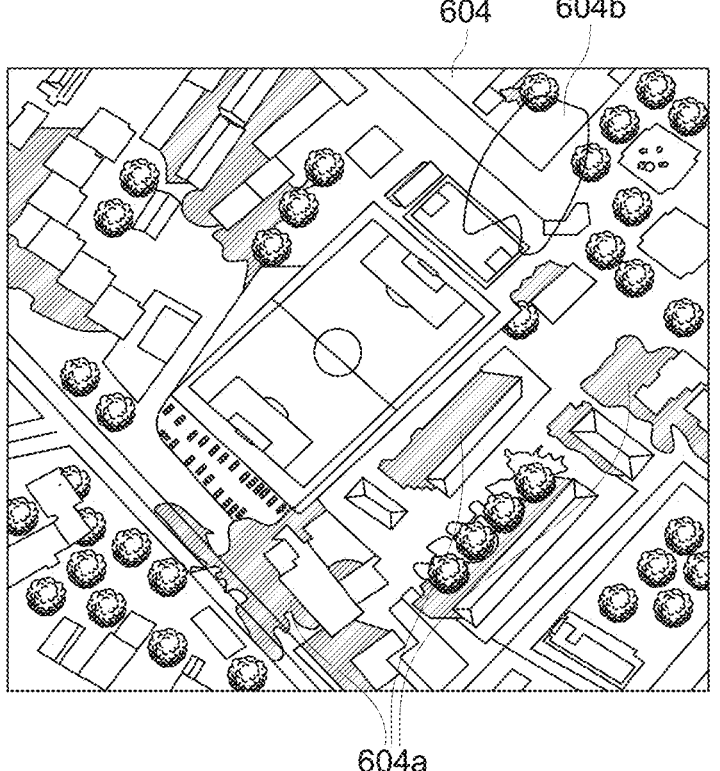
604a
FIG. 6

702
Geographic
data

704
Node data
records

706
Road segment
data records

708
POI data
records

710
Artificial shadow
data records

712
HD data
records

714
Indexes

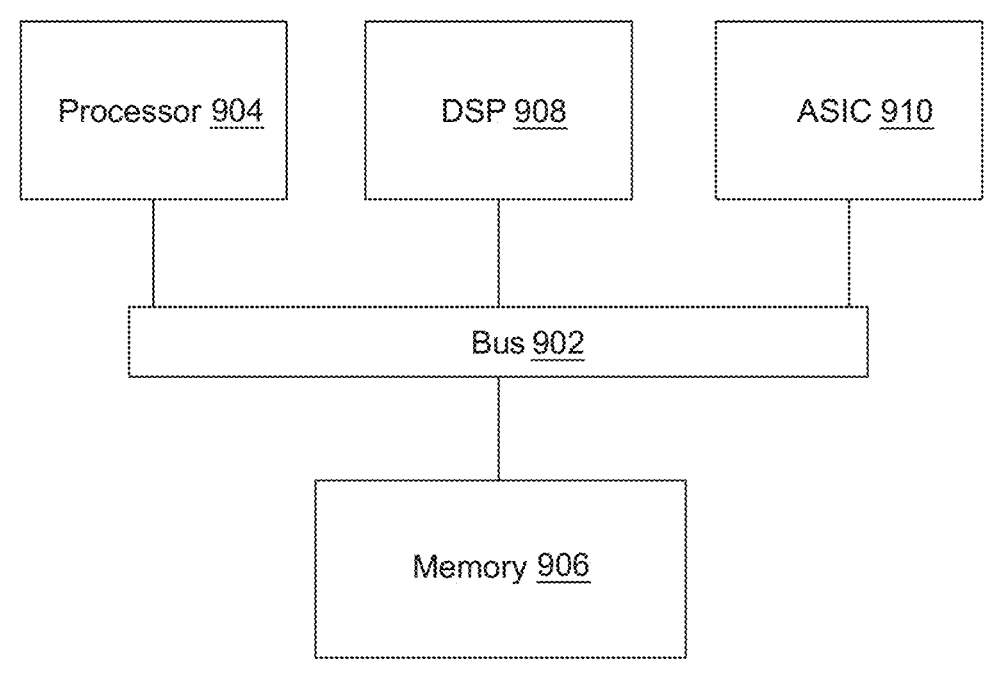
FIG. 9

SYSTEM AND METHOD FOR DETECTION OF ROAD FEATURES BASED ON ARTIFICIAL SHADOW DATA

BACKGROUND

Conventionally, data associated with roads such as road features may be utilized in various applications, for example, for generation of digital maps for navigation. In an example, the road features may include lane markings, signs boards such as stops signs and hazard warning signs, data related to a type of lane, and the like. The data associated with the roads may be obtained by using various methods, for example, by use of satellite images, aerial images, and street-level images.

Typically, a machine learning (ML) model may be trained to detect the road features of the road. The ML model may be trained on a training dataset that may include multiple images of a diversity of roads having different road features. Notably, a majority of images of the multiple images of the diversity of roads may include well-lit areas where the road features may be clearly visible. Moreover, a few images of the multiple images of the diversity of roads may include some shadowed regions where the road features may be unclear. However, an amount of the shadowed regions in such few images may be quite less as compared to an amount of the well-lit areas in the few images. Furthermore, a number of the images having the well-lit areas may be comparatively higher than a number of the few images having the shadowed regions in the training dataset. Due to such imbalances in the dataset used for training, the ML model may be unable to accurately detect the road features in the shadowed regions. Thus, the training of the ML model using the training dataset having the multiple images may be insufficient and may lead to increase in output of false negatives by the ML model.

Thus, there is a need of a system and a method to overcome challenges such as inaccurate training of the ML model for detection of the road features.

SOME EXAMPLE EMBODIMENTS

According to one embodiment, a system for detecting road features is provided. The system comprises at least one processor, and at least one memory including computer program code for one or more computer programs, the at least one memory and the computer program code configured to, with the at least one processor, cause, at least in part, the system to receive image data associated with one or more road features. The received image data may be associated with ground truth label data corresponding to the one or more road features. The system is also caused to determine a set of shadowed regions from one or more images of the received image data. Further, the system is caused to generate artificial shadow data based on a set of shadow characteristics of the determined set of shadowed regions. The system is further caused to augment the image data with the generated artificial shadow data by applying the generated artificial shadow data to the received image data. The system is further caused to train a machine learning (ML) model based on the augmented image data and the ground truth label data. The ML model is trained to detect the one or more road features.

According to another embodiment, a method for detecting one or more road features is provided. The method comprises receiving a first image associated with the one or more road features. The method further comprises detecting the one or more road features based on providing the received first image to a machine learning (ML) model trained at least in part on image data and artificial shadow data. The method further comprises generating an output for the detected one or more road features included in the received first image. Furthermore, the method comprises updating a map database based on the generated output.

According to another embodiment, a non-transitory computer-readable storage medium carries one or more sequences of one or more instructions which, when executed by one or more processors, cause, at least in part, an apparatus to perform operations. The operations comprise receiving image data associated with one or more road features. The operations further comprise determining a set of shadowed regions from one or more images of the received image data. The operations further comprise segmenting a set of shadowed regions in one or more images of the received image data from non-shadowed regions in the one or more images. The operations further comprise processing the set of shadowed regions to obtain a set of shadow characteristics associated with a color of the set of shadowed regions. The operations further comprise processing the set of shadowed regions to determine texture information of the set of shadowed regions. The operations further comprise determining random shapes of shadows based on a Bezier curve. The operations further comprise generating artificial shadow data based on combination of the obtained set of shadow characteristics of the set of shadowed regions, the determined texture information of the set of shadowed regions, and the determined random shapes of shadows. The operations further comprise augmenting the image data to train a machine learning (ML) model based on the generated artificial shadow data.

In addition, for various example embodiments described herein, the following is applicable: a computer program product may be provided. For example, a computer program product comprising instructions which, when executed by a computer, cause the computer to perform any one or any combination of methods, operations, or processes disclosed herein.

According to another embodiment, an apparatus comprises means for receiving image data associated with one or more road features. The received image data may be associated with ground truth label data corresponding to the one or more road features. The apparatus further comprises means for determining a set of shadowed regions from one or more images of the received image data. The apparatus further comprises means for generating artificial shadow data based on a set of shadow characteristics of the determined set of shadowed regions. The apparatus comprises means for augmenting the image data with the generated artificial shadow data by applying the generated artificial shadow data to the received image data. The apparatus further comprises means for training a machine learning (ML) model based on the augmented image data and the ground truth label data. The ML model is trained to detect the one or more road features.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for conducting the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of components of a mapping platform capable of training the ML model and detecting the road features using the ML model, according to one embodiment;

FIG. 4 is a flowchart of a method for training the ML model, according to one embodiment;

FIG. 5 is a flowchart of a method for detecting the road features using the trained ML model, according to one embodiment;

FIG. 6 is a diagram of an exemplary scenario depicting images augmented with the artificial shadow data utilized for training of the ML model, according to one embodiment;

FIG. 9 is a diagram of a chip set that can be used to implement an embodiment.

DESCRIPTION OF SOME EMBODIMENTS

Examples of a system, method, and computer program for training of a machine learning (ML) model to determine road features of a road, based on artificial shadow data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
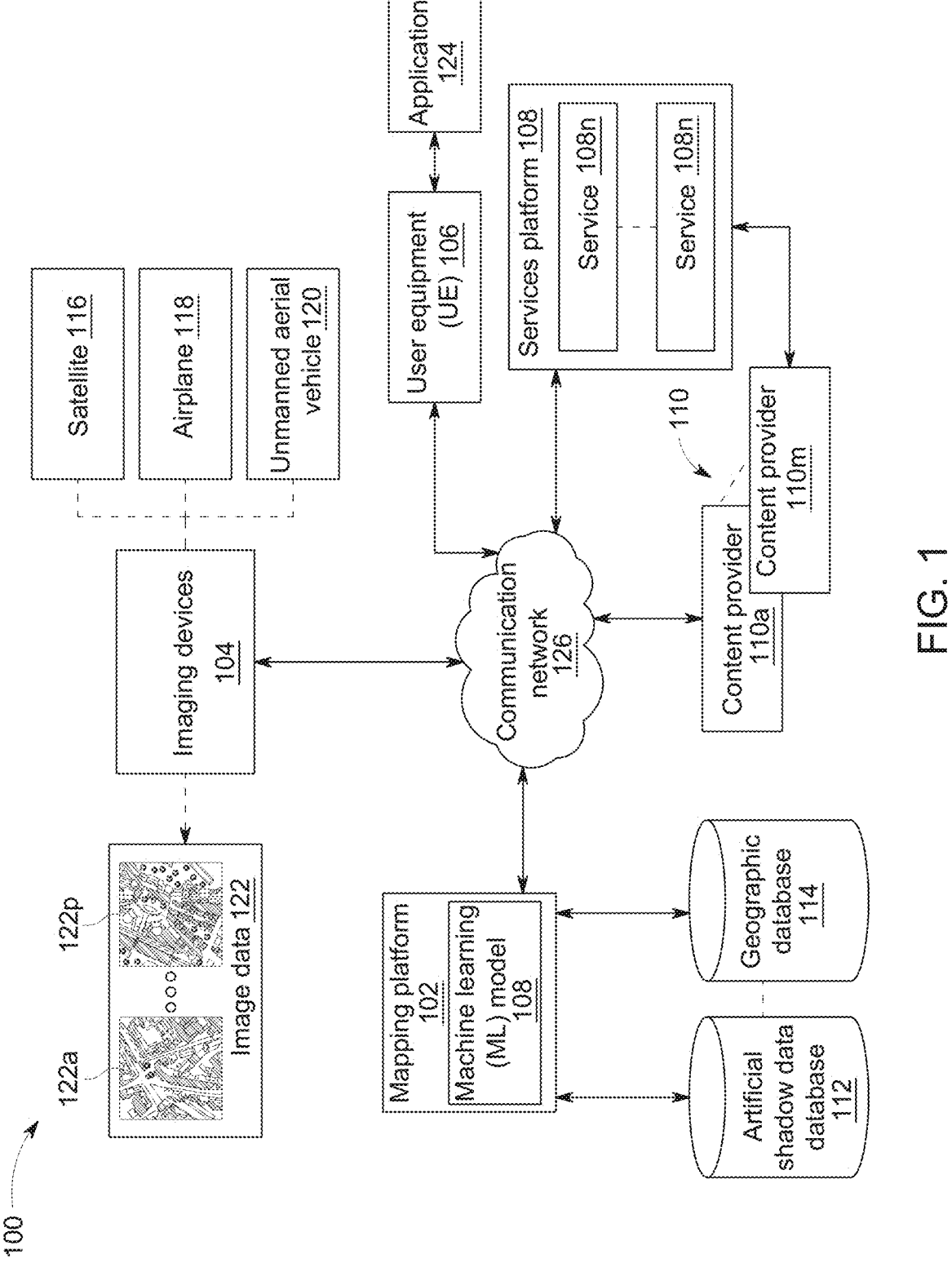
FIG. 1 is a diagram of a system capable of training a machine learning (ML) model and detecting road features using the ML model, according to one embodiment.

FIG. 1 is a diagram of a system 100 capable of training a machine learning (ML) model and detecting road features using the ML model, according to one embodiment. The system 100 may include a mapping platform 102, imaging devices 104 and user equipment (UE) 106. The system 100 may further include services platform 108 and content provider 110. The mapping platform 102 may further include an ML model 108. The mapping platform 102 may further be associated with a geographic database 114 and an artificial shadow database 112. Further, the imaging devices 104 may be on board of at least one of a satellite 116, an airplane 118 or an unmanned aerial vehicle 120. The imaging devices 104 may generate image data 122. Furthermore, the UE 106 may be associated with an application 124. The mapping platform 102, the imaging devices 104, the UE 106, the services platform 108 and the content provider 110 may be communicatively coupled via a communication network 126.

Conventionally, ML models have been utilized to detect road features of a road. The ML models are typically trained on a dataset including images of the road. The conventional dataset on which the ML models are trained may be imbalanced. For example, the conventional dataset may include a large number of normally lighted road features of the road in well-lit regions in the images, but only a small number of shadowed road features in shadowed regions in the images. The training of the ML models on such conventional datasets that are imbalanced may lead to inaccurate and insufficient training of the ML models. Thus, a performance of the ML models may degrade, due to which the road features inside the shadowed regions may have a much lower detection rate as compared to the road features inside the well-lit regions in the images. Hence, the ML models may output a high number of false negatives. In order to mitigate the inaccurate and inefficient training problem of the ML models, collecting and labeling more data in the conventional dataset may not be useful, as the imbalanced distribution between the well-lit features and the shadowed features is a natural subsequence in collected images of the road.

The system 102 of the present disclosure provides a solution for the above mentioned problem of inaccurate and inefficient training of the ML models. The system 102 may be configured to utilize shadow data from one or more images of the image data 122, to augment the image data 122 for training of the ML model 108. The training of the ML model 108 based on the augmented image data 122 may be accurate and efficient, as the problem of imbalanced shadowed regions and the well-lit regions may be mitigated. Thus, the detection of the road features using the ML model 108 trained with the augmented image data 122 may be accurate.

In operation, the mapping platform 102 may be configured to receive the image data 122, such as an image 122a and an image 122p from the imaging devices 104 on board of at least one of the satellite 116, the airplane 118, or the unmanned aerial vehicle 120 via the communication network 126. In some embodiments, the image data 122 associated with the one or more road features comprises may include at least one overhead view image. The image data 122 may be acquired to generate a dataset for training of the ML model 108. The image data may be associated with ground truth label data corresponding to the one or more road features. Details of the acquisition of the image data 122 are further provided, for example, in FIG. 3.

The mapping platform 102 may be further configured to determine a set of shadowed regions from one or more images of the received image data 122. For example, the image 122a may be utilized to determine the set of shadowed regions. The set of shadowed regions may include one or more shadowed regions at least partially overlapping the one or more road features in the image 122a. In some embodiments, the mapping platform 102 may segment the set of shadowed regions from non-shadowed regions in the image 122a to determine the set of shadowed regions. Details of the determination of the set of shadowed regions are further provided, for example, in FIG. 3.

The mapping platform 102 may be further configured to generate artificial shadow data based on the determined set of shadowed regions. In some embodiments, the artificial shadow data may be generated based on a color profile of the set of shadowed regions, a texture information of the set of shadowed regions and random shape of shadows generated based on a Bezier curve. Details of the generation of the artificial shadow data are further provided, for example, in FIG. 3.

The mapping platform 102 may be further configured to augment the image data 122 with the generated artificial shadow data by applying the generated artificial shadow data to the received image data 122. For example, the artificial shadow data may be applied on each image, such as the image 122a and the image 122p to augment the image data 122. The augmented image data 122 may be used to train the ML model 108. Details of augmenting of the image data 122 are further provided, for example, in FIG. 4.

The mapping platform 102 may be further configured to train the ML model 108 based on the augmented image data 122 and the ground truth label data. The ML model 108 may be trained to detect the one or more road features in the provided in the image data 122. The ML model 108 may be trained on the augmented image data 122 until a required or a desired accuracy of the trained ML model 108 is attained. Details of the training of the ML model 108 are further provided, for example, in FIG. 4.

The trained ML model 108 may be able to detect the road features accurately and effectively from an input image of a road having the one or more road features even in the shadowed regions of the image. Details of detecting of the one or more road features using the trained ML model 108 are further provided, for example, in FIG. 5.

Figure 2:
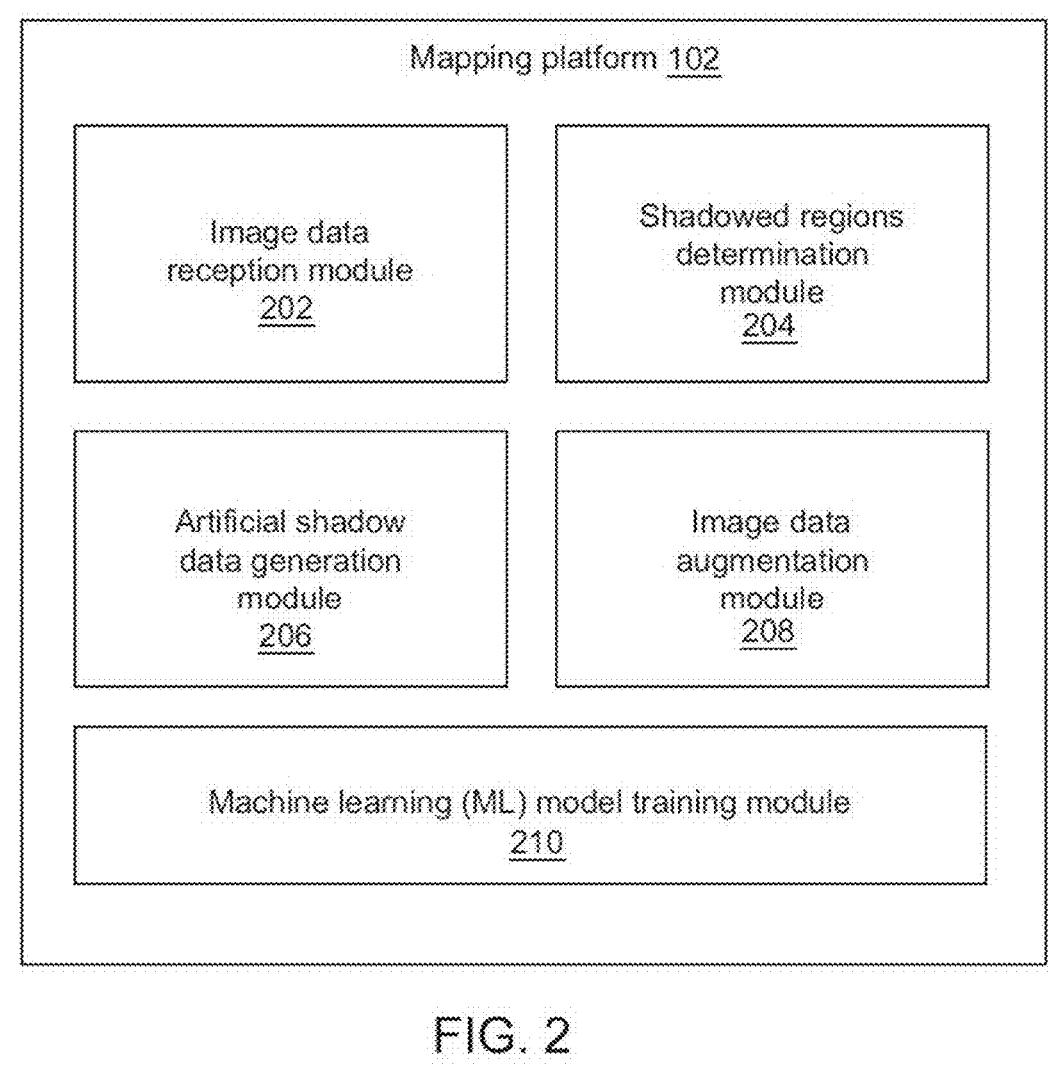

The components of the mapping platform 102 for training of the ML model 108, and detection of the one or more road features are described in FIG. 2.

FIG. 2 is a diagram of components of the mapping platform 102 capable of training the ML model 108 and detecting the road features using the ML model 108, according to one embodiment. In one embodiment, as shown in FIG. 2, the mapping platform 102 of the system 100 includes one or more components for training the ML model 108 and detecting the one or more road features according to the various embodiments described herein. It is contemplated that the functions of the components of the mapping platform 102 may be combined or performed by other components of equivalent functionality. As shown, in one embodiment, the mapping platform 102 includes an image data reception module 202, a shadowed regions determination module 204, an artificial shadow data generation module 206, an image data augmentation module 208 and an ML model training module 210. The above presented modules and components of the mapping platform 102 can be implemented in hardware, firmware, software, or a combination thereof. Though depicted as a separate entity in FIG. 1, it is contemplated that the mapping platform 102 may be implemented as a module of any of the components of the system 100 (e.g., a component of the services platform 108, content providers 110, the UE 106, the application 124, and/or the like). In another embodiment, one or more of the modules 202-210 may be implemented as a cloud-based service, local service, native application, or combination thereof. The functions of the mapping platform 102 and modules 202-210 are discussed with respect to figures below.

Figure 3:
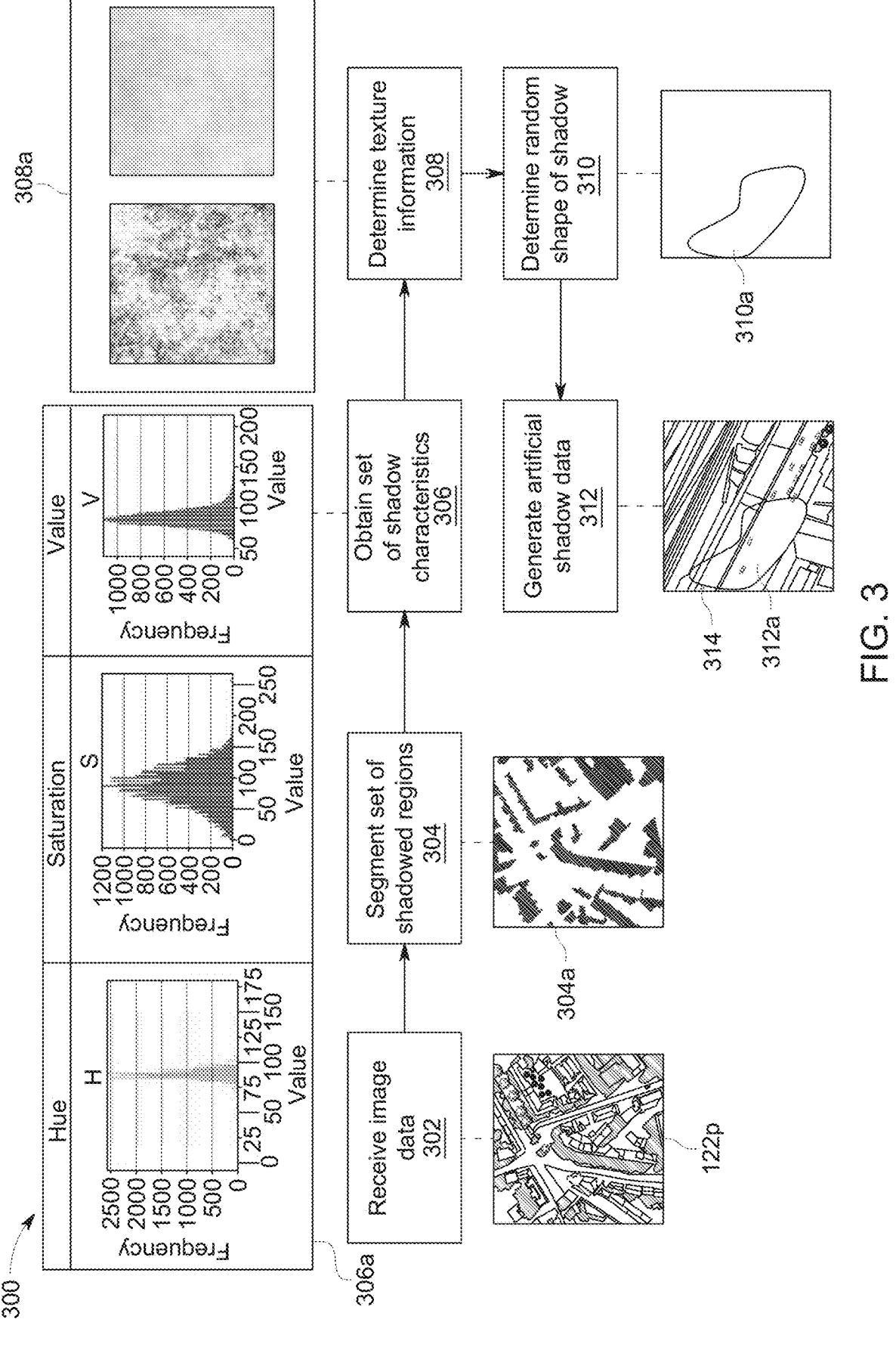
FIG. 3 is a diagram of a method for generating artificial shadow data, according to one embodiment.
Figure 8:
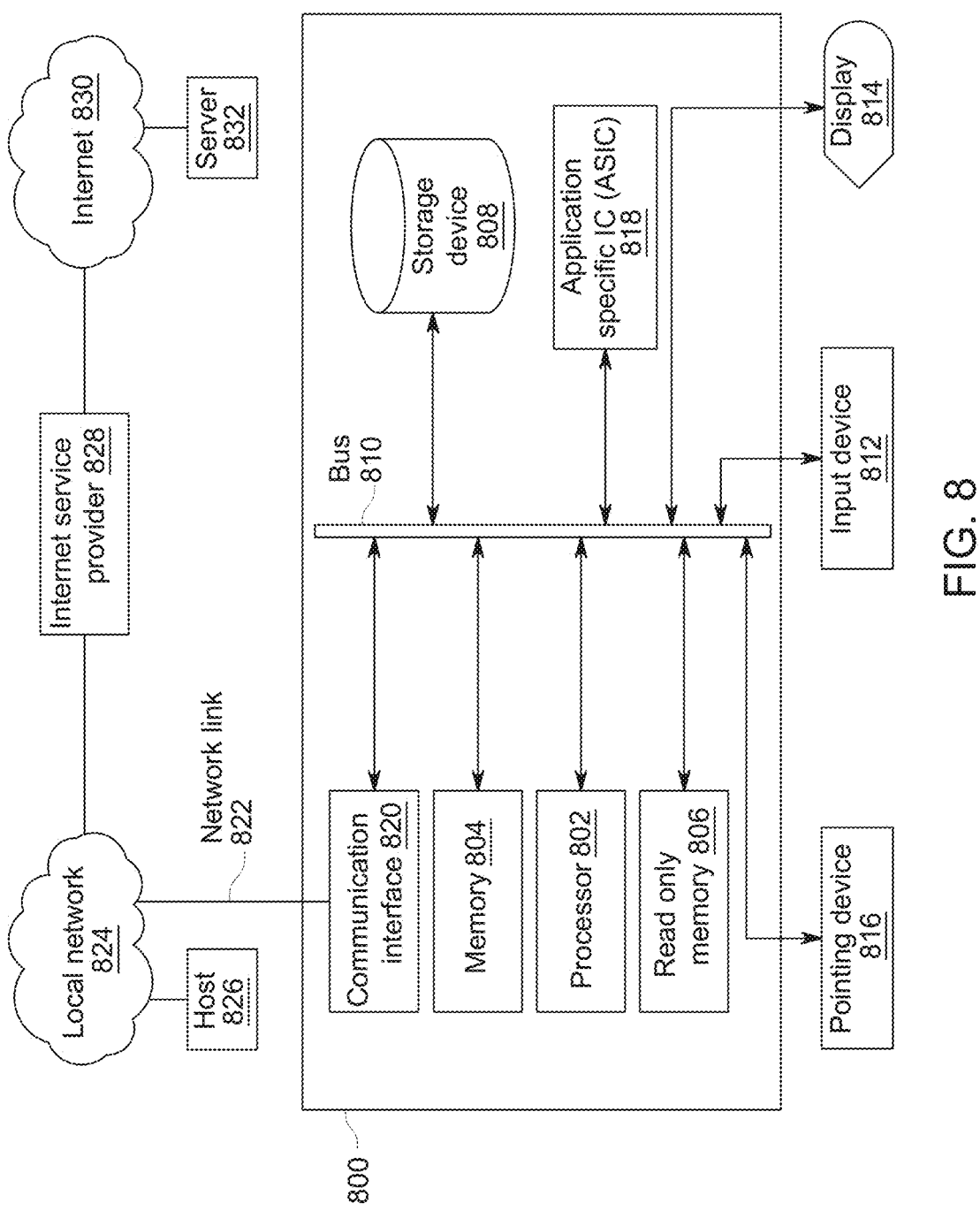
FIG. 8 is a diagram of hardware that can be used to implement an embodiment.

FIG. 3 is a diagram of a method 300 for generating the artificial shadow data, according to one embodiment. In various embodiments, the mapping platform 102 and/or any of the modules 202-210 may perform one or more portions of the method 300 and may be implemented in, for instance, a chip set including a processor and a memory as shown in FIG. 8 and FIG. 9. As such, the mapping platform 102 and/or any of the modules 202-210 may provide means for accomplishing various parts of the method 300, as well as means for accomplishing embodiments of other processes described herein in conjunction with other components of the system 100. Although the method 300 is illustrated and described as a sequence of steps, it is contemplated that various embodiments of the method 300 may be performed in any order or combination and need not include all of the illustrated steps.

In step 302, the image data 122 may be received. The image data reception module 202 of the mapping platform 102 may be configured to receive the image data 122 from the imaging devices 104. In some embodiments, the image data 122 associated with the one or more road features may be received from at least one of the imaging devices 104 on board the satellite 116, the airplane 118 or the unmanned aerial vehicle 120 of the imaging devices 104. The imaging devices 104 may capture images of a plurality of roads. The imaging devices 104 may be configured to capture multiple images of the plurality of roads from various angles and height. In an embodiment, the ground truth label data corresponding to the one or more road features of the image data 122 may be obtained from a user.

The ground truth label data may be metadata associated with the image data 122. For example, the ground truth label data may include labels formatted as one or more polygons, lines or points. The one or more polygons may enclose the one or more road features in the image data 122, for example, crosswalks and gore areas. In an embodiment, the one or more polygons may have different shapes, such as a rectangle or a circle. Further, the lines may be used to represent the road features such as stop lines in the image data 122. In an example, a sequence of the lines may be used to represent lane boundary markings in the image data 122. Furthermore, the points may be used to represent the road features such as poles in the image data 122. In certain scenarios, the ground truth label data may be stored as a separate label file in the geographic database 114.

In some embodiments, the image data 122 may be other overhead imagery received from sources, such as a server. The server may include overhead imagery of a plurality of geographical locations. The overhead imagery of the plurality of geographical locations may further be annotated or provided with the ground truth label data of the one or more features.

In some embodiments, the image data 122 may include at least one of a visible light imagery, an infrared imagery, a radio detection and ranging (RADAR) imagery, a multispectral imagery, a hyperspectral imagery, or a combination thereof. In some embodiments, the imaging devices 104 may have a capability of capturing the visible light imagery, the infrared imagery, the RADAR imagery, the multispectral imagery and the hyperspectral imagery. The visible light imagery may depict the plurality of geographical locations as visible to the human eye, for example locations comprising the one or more road features and the plurality of roads. The infrared imagery or thermal imagery may depict the plurality of geographical locations in form of thermal maps. The infrared imagery may be obtained from the imaging devices, such as thermographic cameras. The RADAR imagery of the plurality of geographical locations may be obtained using the RADAR imaging devices. The multispectral imagery may depict the plurality of geographical locations using specific wavelengths beyond visible light (such as red, green, and blue) spaces. For example, the multispectral imagery may utilize infrared and ultraviolet wavelengths to depict the image data 122. The hyperspectral imagery may depict the plurality of geographical locations using a wider variety of the specific wavelengths as compared to the multispectral imagery.

The image data 122 received from the imaging devices 104 or the server may be stored in the geographic database 114. The image data 122 may include multiple images, such as the image 122a and the image 122p of a plurality of roads having the one or more road features. For example, the one or more road features may include lane markings, edge of the roads, sidewalks, pavements, road signs, and the like. The lane markings may represent lines or shapes corresponding to the road. Examples of the plurality of lane markings may include, but may not be limited to, road lane markings, traffic lane markings, highway lane markings, reversible lane markings, pavement arrows, edge lines of the road, and pavement markings.

For generation of the artificial shadow data, the mapping platform 102 may select one or more images from the image data 122 that may include shadowed regions. For example, the mapping platform 102 may select the image 122a from the image data 122 that includes the shadowed regions.

In step 304, the set of shadowed regions may be segmented. The shadowed regions determination module 204 of the mapping platform 102 may be configured to determine the set of shadowed regions from one or more images, such as the image 122a of the received image data 122. In some embodiments, the mapping platform 102 may be configured to perform segmenting of the set of shadowed regions in the image 122a from non-shadowed regions in the image 122a to determine the set of shadowed regions. The mapping platform 102 may generate a segmented image 304a based on the segmentation that depicts the set of shadowed regions segmented from the non-shadowed regions of the image 122a.

The mapping platform 102 may create an image mask for the image 122a to generate the segmented image 304a. In some embodiments, the segmenting of the set of shadowed regions in the image 122a may be based on a multi-color-space thresholding technique. The multi-color-space thresholding technique may be a rule based thresholding technique utilized to segment the set of shadowed regions.

In some embodiments, the mapping platform 102 may perform the segmenting of the set of shadowed regions in the image 122a based on application of a segmentation ML model on the image 122a. The segmentation ML model may be trained based on at least one of an instance segmentation technique or a semantic segmentation technique. In instance segmentation technique, each detected object in an image may be provided with a unique label. In such a segmentation technique, a relationship between different objects in the image may be irrelevant. The instance segmentation technique may be used to train the segmentation ML model to segment the set of shadowed regions in the image 122a, without having to depend on the relationship between the different objects. In the semantic segmentation technique, all objects that belong to a same class are assigned a same label. For example, each of the shadowed regions may be provided with a same label and each of the non-shadowed regions may be provided with the same label. The mapping platform 102 may provide, as an input, the image 102a to the trained segmentation ML model. The segmentation ML model may output the segmented image 304a.

In some embodiments, the mapping platform 102 may perform the segmenting of the set of shadowed regions in the image 122a based on one or more computer vision-based techniques. The one or more computer vision-based techniques may be applied on the image 122a to generate the segmented image 304a. The one or more computer vision-based techniques may include at least one of a mean shift segmentation technique, a watershed segmentation technique, or a region growing segmentation technique. The mean shift segmentation technique may be an unsupervised learning technique that involves shifting each data point of an image, such as the image 122a to a cluster or a group for generating the segmented image 304a. The watershed segmentation technique involves converting the image 122a into a grayscale image and dividing each object in the image 122a by use of lines. The watershed segmentation technique may be applied on the image 122a to output the segmented image 304a. Furthermore, the region growing segmentation technique may be a pixel based technique that may be applied on the image 122a. The region growing segmentation technique processes each pixel of the image 122a to output the segmented image 304a.

In step 306, a set of shadow characteristics may be obtained. In some embodiments, the shadowed regions determination module 204 may be configured to determine the one or more shadowed regions of the set of shadowed regions that are at least partially overlapping the one or more road features in the one or more images. For example, the one or more shadowed regions that are partially or fully overlapping to the one or more road features in the image 122*a* may be determined. In an example, desired road features, such as the lane markings in the image 122*a* may be determined. The one or more shadowed regions may be determined that are at least partially overlapping the desired lane markings in the image 122*a*. Further, the artificial shadow data generation module 206 may be configured to process the determined one or more shadowed regions to obtain a set of shadow characteristics associated with the one or more shadowed regions. The set of shadow characteristics may be associated with, for example, a transformation of the image 122*a*.

In some embodiments, the obtained set of shadow characteristics is obtained via spectral transformation of the one or more shadowed regions. The spectral transformation is performed by at least one of a principal component analysis (PCA) technique, a minimum noise fraction (MNF) technique, or an independent component analysis (ICA) technique. The spectral transformation of the one or more shadowed regions in the image 122*a* enables determination of statistical properties of the one or more shadowed regions. The PCA technique may be utilized to reduce a dimensionality of the image 122*a* to emphasis on the processing of the one or more shadowed regions. The MNF technique divides the image 122*a* into noisy cube data and outputs the image 122*a* with the reduced dimensionality. The ICA technique divides data of the image 122*a* into sub-parts that may be independent. The sub-parts may be processed separately to output the image 122*a* with the reduced dimensionality. The spectral transformation may be utilized by the mapping platform 102 to obtain the set of shadow characteristics.

In some embodiments, the obtained set of shadow characteristics may represent a color profile of the one or more shadowed regions in at least one of a hue saturation value (HSV) color space, or a red green blue (RGB) color space. The color profile of the one or more shadowed regions may be determined in the HSV space. For example, a color distribution of the one or more shadowed regions may be complied with a mean value±(2–standard deviation (σ)) shadowed region according to an HSV value distribution 306*a*. The HSV value distribution 306*a* may depict different values of the hue and the saturation of the one or more shadowed regions. Moreover, the color profile may be represented in the RGB space that may specify the values associated with the red, the green and the blue colors in the one or more shadowed regions. In such a manner the mapping platform 102 may perform color parametrization of the one or more shadowed regions.

In step 308, texture information 308*a* may be determined. In some embodiments, the artificial shadow data generation module 206 of the mapping platform 102 may be configured to determine the texture information 308*a* of the one or more shadowed regions. The texture information 308*a* may be utilized to determine a texture of shadows in the artificial shadow data.

In an embodiment, the texture information 308*a* may be determined based on elimination of pixel data of objects in the one or more shadowed regions from noisy background data associated with the one or more shadowed regions. For example, a noisy pixel (P) in the one or more shadowed regions may be defined as a summation of the pixel data of objects (p) and the noisy background data (n). Thus, P=p+n. The noisy background data (n) may be separated from the pixel data of objects (p) by subtracting image contents that may be consistent across multiple frames acquired by the imaging device 104. In an exemplary scenario, the imaging devices 104 may capture multiple images of the road having the one or more road features. The noisy background data (n) may be separated from the pixel data of objects (p) from the one or more shadowed regions at least partially overlapping the one or more road features, by subtracting the consistent image contents in the multiple images. For example, the image content may be objects, such as buildings, trees and the like. The mapping platform 102 may eliminate the pixel data of objects (p), such as the buildings and the trees from the noisy background data (n) in the one or more shadowed regions. The segmented noisy background data (n) may be utilized to determine the texture information 308*a* for the artificial shadow data.

In some embodiments, the texture information 308*a* of the one or more shadowed regions may be determined based on a denoising kernel. The artificial shadow data generation module 206 may be configured to determine the texture information 308*a* of the one or more shadowed regions based on the denoising kernel. In case the multiple images of the road may be unavailable, the artificial shadow data generation module 206 may utilize the denoising kernel to segment the noisy background data (n) from the pixel data of objects (p) from the one or more shadowed regions, to determine the texture information 308*a*. For example, a 5×5 size or a 7×7 size denoising kernel may be utilized to determine an average of neighborhood of the noisy pixel (P) within a single image of the road captured by the imaging device 104. Thus, different types of shadow patterns may be determined as the texture information 308*a*, to generate the artificial shadow data.

In step 310, random shapes of shadows may be determined. In some embodiments, the artificial shadow data generation module 206 may be configured to determine the random shapes of shadows based on a Bezier curve. Typically, natural shadows over geographic regions may have arbitrary shaped appearances due to factors such as relative sun position, view angle, shapes of occluding objects (e.g. clouds, buildings, etc.), and so forth. To simulate the shadowed regions in a synthetic manner or generating the artificial shadow data, shadows having randomly shaped silhouette may need to be generated.

To this end, an n dimensional Bezier curve may be utilized to produce the random shapes "S (t)" of the shadows that compose of Bernstein basis polynomials of degree "n" as depicted in the following equation:

$$S(t) = \sum_{i=0}^{n} P_i b_{i,n}(t), \, t \in [0, 1] \quad (1)$$

where $P_i$ is a control point for the Bezier curve, and the Bernstein basis polynomials $b_{i,n}(t)$ of degree "n: may be defined as:

$$b_{i,n}(t) := \binom{n}{i} t^i (1-t)^{n-1}, \, i = 0, \dots n \quad (2)$$

The Bernstein basis polynomials may be weighting functions for the Bezier curve. The Bezier curve is completely contained in a convex hull built from the control points $P_i$. Based on the Bezier curve equations 1 and 2, the random shapes of shadows, such as a shape 310*a* of a shadow may be determined. Similarly, multiple random shapes may be determined using the Bezier curve.

In step 312, the artificial shadow data may be generated. The artificial shadow data generation module 206 may be configured to generate the artificial shadow data based on the determined set of shadowed regions. In some embodiments, the determined set of shadowed regions may include the one or more shadowed regions at least partially overlapping the one or more road features included in the image data 122, such as the image 122*a*. In some embodiments, the artificial shadow data generation module 206 may be configured to combine the set of shadow characteristics (such as the HSV value distribution 306*a*) of the one or more shadowed regions, the texture information 308*a* of the one or more shadowed regions, and the random shapes of shadows (such as the shape 310*a* of the shadow) to generate artificial shadow data 312*a*. The generated artificial shadow data 312*a* may be applied on images of the image data 122 to generate augmented image data 314.

The augmented image data 314 may be utilized to train the ML model 108 further explained in FIG. 4.

FIG. 4 is a flowchart of a method 400 for training the ML model 108, according to one embodiment. In various embodiments, the mapping platform 102 and/or any of the modules 202-210 may perform one or more portions of the method 400 and may be implemented in, for instance, a chip set including a processor and a memory as shown in FIG. 8 and FIG. 9. As such, the mapping platform 102 and/or any of the modules 202-210 may provide means for accomplishing various parts of the method 400, as well as means for accomplishing embodiments of other processes described herein in conjunction with other components of the system 100. Although the method 400 is illustrated and described as a sequence of steps, it is contemplated that various embodiments of the method 400 may be performed in any order or combination and need not include all of the illustrated steps.

In step 402, the image data 122 may be received. The image data reception module 202 may be configured to receive the image data 122 from the imaging devices 104. The received image data may be associated with the ground truth label data corresponding to the one or more road features. The image data 122 may be utilized to generate a training dataset for the ML model 108. Details of the reception of the image data 122 are further provided, for example, at step 302 in FIG. 3.

In step 404, the set of shadowed regions may be determined. The shadowed regions determination module 204 may be configured to determine the set of shadowed regions in one or more images, such as the image 122*a* or the image 122*p* of the received image data 122. Details of the determination of the set of shadowed regions are further provided, for example, at step 304 in FIG. 3.

In step 406, the artificial shadow data 312*a* may be generated. The artificial shadow data generation module 206 may be configured to generate the artificial shadow data 312*a* based on the determined set of shadowed regions. In some embodiments, the set of shadowed regions may include the one or more shadowed regions at least partially overlapping the one or more road features included in the image data 122, such as the image 122*a* or the image 122*p*. Details of the generation of the artificial shadow data 312*a* are further provided, for example, at step 312 in FIG. 3.

In step 408, the image data 122 may be augmented. The image data augmentation module 208 may be configured to augment the image data 122 with the generated artificial shadow data 312*a* by applying the generated artificial shadow data 312*a* to the received image data 122. For example, the artificial shadow data 312*a* may be generated by use of only one or more images of the image data 122.

However, all images of the received image data 122 may be augmented by using the artificial shadow data 312*a*. In an exemplary scenario, the image data augmentation module 208 may generate a plurality of artificial shadows that may be included in the artificial shadow data 312*a*. For example, different artificial shadows may have a different shape, a different color profile and a different texture. Each image of the received image data 122 may be augmented with different artificial shadows. In an embodiment, one or more images of the image data 122 may be augmented with more than one artificial shadows of the artificial shadow data 312*a*. Examples of the image data 122 augmented with the artificial shadow data 312*a* are further shown in FIG. 6.

In step 410, the ML model 108 may be trained. The ML model training module 210 may be configured to train the ML model 108 based on the augmented image data 314 and the ground truth label data. For example, the ground truth label data may be metadata obtained from a user for the one or more road features in the image data 122. For example, the one or more polygons, the lines and the points corresponding to the one or more road features may be generated as the ground truth label data. The ground truth label data may be considered as reference data for the detection of the one or more road features. The label file of the ground truth label data may be retrieved from the geographical database 114.

The augmented image data 314 may be fed to the ML model 108. In an embodiment, the ML model 108 may output the detected one or more road features along with a confidence score. In some embodiments, a format of the output of the ML model 108 may be same as a format of the ground truth label data. For example, the output may include the labels, such as the one or more polygons, the lines or the points corresponding to the one or more road features in the augmented image data 314.

The confidence score may indicate a confidence of the ML model 108 in detection of the one or more road features. In an example, the confidence score may have values between 0 and 1. The confidence score closer to the value 1 may indicate a higher confidence than the confidence score closer to the value 0. For example, the confidence score of 0.8 may indicate a high confidence of the ML model 108 in detection of the one or more road features. The ground truth label data is further utilized to assess the output, i.e., the detected one or more road features of the input augmented image data 314. The mapping platform 102 may assess similarities between the ground truth label data of the road features in the augmented image data 314 and the output road features by the ML model 108. For example, the output of the ML model 108 may be an image with the labels including the one or more polygons, the lines and the points. The mapping platform 102 may determine the similarity between the labels of the output image with the ground truth label data of the corresponding augmented image data 314. In case the similarities between the ground truth label data and the output of the ML model 108 is higher, the confidence score may be closer to 1.

In an embodiment, the ML model 108 may be trained until the confidence score is greater than a threshold value. The threshold value may be predefined by a user of the mapping platform 102. The threshold value may correspond to a benchmark confidence score that needs to be output by the ML model 108 for accurate detection of the one or more road features. In an example, the threshold value may be 0.9. Thus, in such a case, the ML model training module 210 may be configured to train the ML model 108 until the confidence score output by the ML model 108 is equal to or more than the threshold value of "0.9". The ML model 108 is trained to detect the one or more road features in the provided in the image data 122.

Therefore, the training of the ML model 108 with the augmented image data 314 may be better balanced with respect to the number of shadowed and non-shadowed regions, and may eliminate or reduce the false positives output by the ML model 108. The ML model 108 trained with the augmented image data 314 may be able to accurately detect the one or more road features, even when the one or more road features are present in the shadowed regions. Thus, once the ML model 108 is trained, the ML model 108 may be employed to detect the one or more road features from input images.

The detection of the one or more road features by use of the ML model 108 is further described in FIG. 5.

FIG. 5 is a flowchart of a method 500 for detecting the road features using the trained ML model 108, according to one embodiment. In various embodiments, the mapping platform 102 and/or any of the modules 202-210 may perform one or more portions of the method 500 and may be implemented in, for instance, a chip set including a processor and a memory as shown in FIG. 8 and FIG. 9. As such, the mapping platform 102 and/or any of the modules 202-210 may provide means for accomplishing various parts of the method 500, as well as means for accomplishing embodiments of other processes described herein in conjunction with other components of the system 100. Although the method 500 is illustrated and described as a sequence of steps, it is contemplated that various embodiments of the method 500 may be performed in any order or combination and need not include all of the illustrated steps.

In step 502, a first image associated with the one or more road features may be received. In some embodiments, the mapping platform 102 may be configured to receive the first image associated with the one or more road features. The first image may be for example, an image under analysis or an unprocessed image to be fed to the trained ML model 108. For example, the first image may include a road having the plurality of lane markings as the road features. The first image may be captured by the imaging devices 104. In one or more embodiments, the first image may be received from a third-party source, such as a server.

In step 504, the one or more road features may be detected. In some embodiments, the mapping platform 102 may be configured to detect the one or more road features based on providing the received first image to the ML model 108 trained at least in part on the image data 122 and the artificial shadow data 314. The mapping platform 102 may provide the first image to the trained ML model 108 as an input. The ML model 108 may provide an output, as the detected one or more road features. In an embodiment, the ML model 108 may further output the confidence score associated with the detected one or more road features, such as the plurality of lane markings.

In step 506, the output for the detected one or more road features may be generated. In some embodiments, the mapping platform 102 may be configured to generate the output for the detected one or more road features included in the received first image. For example, the output may include the first image having the labels formatted as the points, the lines or the polygons marking the one or more road features as detected road features. Furthermore, the output may include the label of the type of the road feature and the confidence score of the detection. In an example, the one or more road features may be highlighted with a different color to represent the detected one or more road features. Thus, the trained ML model 108 may be used to detect the one or more road features associated with the roads accurately and efficiently.

In step 508, a map database, such as geographic database 114, may be updated. In some embodiments, the mapping platform 102 may be configured to update the map database with the generated output for the detected one or more road features. In an embodiment, the format of the generated output may be same as the format of the ground truth label data. For example, the generated output may include the one or more polygons, the lines or the points to represent the road features. In an example, the road feature "stop line" may be represented by a line having two end points in the output. In another example, the road feature "lane markings" may be represented by line strings in the output. The updated map database may be utilized in various applications, such as map generation for navigation purposes. Furthermore, the detected one or more road features may further be utilized to update several data records, such as node data records, road segment data records, point of interest (POI) data records, an HD data records of geographic data of the geographical database 114.

Exemplary augmented image data for training of the ML model 108 are further shown in FIG. 6.

FIG. 6 is a diagram of an exemplar scenario 600 depicting images augmented with the artificial shadow data utilized for training of the ML model 108, according to one embodiment. The exemplar scenario 600 may include an augmented image 602 and an augmented image 604.

The augmented image 602 may include an overhead view of a geographic region. The mapping platform 102 may obtain the set of shadow characteristics of one or more shadowed regions 602a and determine the texture information of the one or more shadowed regions 602a of one or more images of the image data 122. The mapping platform 102 may further determine random shapes of shadows using the Bezier curve. The mapping platform 102 may generate shadow data 602b based on combination of the set of shadow characteristics, the texture information and the random shape of shadow. The mapping platform 102 may further apply the generated shadow data 602b on at least one image of the image data 122 to obtain the augmented image 602. The generated shadow data 602b may be applied anywhere on the at least one image to obtain the augmented image 602.

Similarly, the augmented image 604 may include an overhead view of the geographic region. The mapping platform 102 may generate shadow data 604b based on combination of the set of shadow characteristics of one or more shadowed regions 604a, the texture information of the one or more shadowed regions 604a and the random shape of shadow. The mapping platform 102 may further apply the generated shadow data 604b on at least one image of the image data 122 to obtain the augmented image 604. The generated shadow data 604b may be applied anywhere on the at least one image to obtain the augmented image 604. Thus, in such a manner the training dataset comprising the augmented image data may be generated to train the ML model 108.

The augmented image data, such as the augmented image 602 and the augmented image 604 may be utilized in various applications. In an example, the augmented image data may be utilized to generate a repository of the artificial shadow data. In another example, the artificial shadow data may be applied on an image data input pipeline in the training of the ML model 108, augmenting the image data 122 in near-real time. In such a manner, the ML model 108 may be trained online. In another example, the artificial shadow data may be utilized to create a listing in a data marketplace. In such a case, users such as different vendors may utilize a service of generating the artificial shadow data and augmenting images. In another example, the artificial shadow data may be utilized to test the trained ML models for accuracy. In such a case, the augmented image data may be provided to the trained ML models. The output of the trained ML models may be analyzed to check whether they meet the accuracy requirements.

Returning to FIG. 1, as shown, the system 100 includes the mapping platform 102 for training the ML model 108 and detecting the road features using the ML model 108. In some embodiments, the artificial shadow data database 112 may be a part of the geographical database 114. The services platform 108 may include one or more services, such as a service 108a and a service 108n. The content providers 110 may further include one or more content providers, such as a content provider 110a and a content provider 110m.

In some embodiments, the imaging devices 104 may be utilized to capture the image data 122, such as the image 122a and the image 122p. The imaging devices 104 on board the satellite 116 may be configured to capture the overhead view of the geographical regions at a certain height from the geographical region. Similarly, the imaging devices 104 on board the airplane 118 and the unmanned aerial vehicle 120 (UAVs) camera may be configured to capture the overhead view of the geographical regions at the certain height from the geographical region.

In one embodiment, the mapping platform 102 has connectivity over the communication network 126 to the services platform 108 that provides the one or more services, such as the service 108a and the service 108n that can use the artificial shadow data database 112 for downstream functions. By way of example, the service 108a and the service 108n may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the service 108a and the service 108n uses the output of the mapping platform 102 (e.g., the artificial shadow data 312a stored in the artificial shadow data database 112, the maps stored in the geographic database 114, etc.) to provide services such as navigation, mapping, other location-based services, etc. to the UE 106, the applications 122, and/or other client devices.

In one embodiment, the mapping platform 102 may be a platform with multiple interconnected components. The mapping platform 102 may include multiple servers, intelligent networking devices, computing devices, components, and corresponding software for computation of the artificial shadow data 312a and training the ML model 108 according to the various embodiments described herein. In addition, it is noted that the mapping platform 102 may be a separate entity of the system 100, a part of the service 108a and the service 108n, a part of the services platform 108, or included within components of the UE 106.

In one embodiment, the content providers 110 may provide content or data (e.g., the image data 122, probe data, related geographic data, etc.) to the geographic database 114, the ML model 108, the mapping platform 102, the services platform 108, the service 108a and the service 108n, the UE 106, and/or the applications 122 executing on the UE 106. The content provided may be any type of content, such as the image data 122, sensor data, imagery, probe data, machine learning models, permutations matrices, map embeddings, map content, textual content, video content, image content, etc., for example, obtained via the satellite 116, the airplane 118 or the unmanned aerial vehicle 120. In one embodiment, the content providers 110 may provide content that may aid in generation of the artificial shadow data 312 a according to the various embodiments described herein. In one embodiment, the content providers 110 may also store content associated with the geographic database 114, the mapping platform 102, the services platform 108, the service 108 a and the service 108 n, and/or any other component of the system 100. In another embodiment, the content providers 110 may manage access to a central repository of data, and offer a consistent, standard interface to data, such as a repository of the geographic database 114.

In one embodiment, the UE 106 may execute software applications 122 to use the artificial shadow data 312a or other data derived therefrom according to the embodiments described herein. By way of example, the applications 122 may also be any type of application that is executable on the UE 106, such as autonomous driving applications, routing applications, mapping applications, location-based service applications, navigation applications, device control applications, content provisioning services, camera/imaging application, media player applications, social networking applications, calendar applications, and the like. In one embodiment, the applications 122 may function as a client for the mapping platform 102 and perform one or more functions associated with generation of the artificial shadow data 312a to train the ML model 108 alone or in combination with the mapping platform 102.

By way of example, the UE 106 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 106 can support any type of interface to the user (such as "wearable" circuitry, etc.). In one embodiment, the UE 106 may be associated with or be a component of a vehicle or any other device.

In one embodiment, the UE 106 is configured with various sensors for generating or collecting the image data 122, related geographic data, etc. In one embodiment, the image data 122a represent data associated with a geographic location or coordinates at which sensor data was collected, and the polyline or polygonal representations of detected objects of interest derived therefrom to generate the digital map data of the geographic database 114. By way of example, the sensors may include a global positioning sensor for gathering location data (e.g., GPS, GALILEO, BEIDOU, GLONASS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 106 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the UE 106 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 106 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 126 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 102, the services platform 108, the service 108a and the service 108n, the UE 106, and/or the content providers 110 communicate with each other and other components of the system 100 using well known, new or still developing protocols. In this context, a protocol includes a set of rules defining how the network nodes within the communication network 126 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 7:
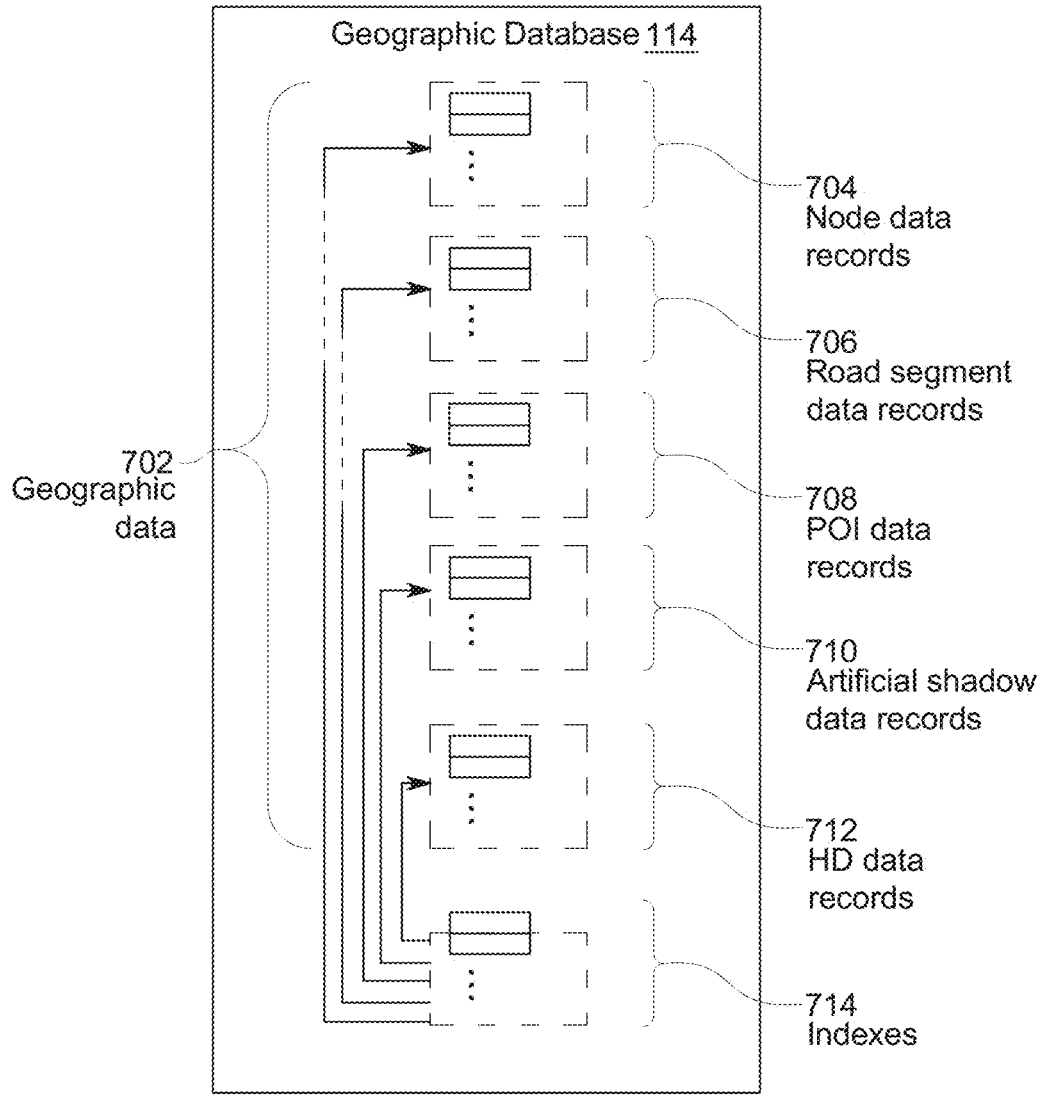
FIG. 7 is a diagram of a geographic database, according to one embodiment.

FIG. 7 is a diagram of the geographic database 114, according to one embodiment. In one embodiment, the geographic database 114 includes geographic data 702 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 702. In one embodiment, the geographic database 114 include high definition (HD) mapping data that provide centimeter-level or better accuracy of map features. For example, the geographic database 114 can be based on Light Detection and Ranging (LiDAR) or equivalent technology to collect billions of 3D points and model road surfaces and other map features down to the number lanes and their widths. In one embodiment, the HD mapping data (e.g., HD data records 712) and/or other mapping data of the geographic database 114 capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 114.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 114 follows certain conventions. For example, links do not cross themselves and do not cross each other except at a node. Also, there are no duplicated shape points, nodes, or links. Two links that connect each other have a common node. In the geographic database 114, overlapping geographic features are represented by overlapping polygons. When polygons overlap, the boundary of one polygon crosses the boundary of the other polygon. In the geographic database 114, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 114 includes node data records 704, road segment or link data records 706, POI data records 708, artificial shadow data records 710, HD mapping data records 712, and indexes 714, for example. More, fewer, or different data records can be provided. In some embodiments, the artificial shadow data records 710 may be stored in the artificial shadow data database 112. In one embodiment, additional data records (not shown) can include cartographic ("carto") data records, routing data, and maneuver data. In one embodiment, the indexes 714 may improve the speed of data retrieval operations in the geographic database 114. In one embodiment, the indexes 714 may be used to quickly locate data without having to search every row in the geographic database 114 every time it is accessed. For example, in one embodiment, the indexes 714 can be a spatial index of the polygon points associated with stored feature polygons. In one or more embodiments, data of a data record may be attributes of another data record.

In exemplary embodiments, the road segment data records 706 are links or segments representing roads, streets, paths, or bicycle lanes, as can be used in the calculated route or recorded route information for determination of speed profile data. The node data records 704 are end points (for example, representing intersections or an end of a road) corresponding to the respective links or segments of the road segment data records 706. The road segment data records 706 and the node data records 704 represent a road network, such as used by vehicles, cars, and/or other entities. Alternatively, the geographic database 114 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 114 can include data about the POIs and their respective locations in the POI data records 708. The geographic database 114 can also include data about road attributes (e.g., traffic lights, stop signs, yield signs, roundabouts, lane count, road width, lane width, etc.), places, such as cities, towns, or other communities, and other geographic features, such as bodies of water, mountain ranges, etc. Such place or map feature data can be part of the POI data records 708 or can be associated with POIs or POI data records 708 (such as a data point used for displaying or representing a position of a city).

In one embodiment, the geographic database 114 can also include the artificial shadow data records 710 for storing the artificial shadow data, trained machine learning models, and/or any other related data that is used or generated according to the embodiments described herein. By way of example, the artificial shadow data records 710 can be associated with one or more of the node records 704, the road segment records 706, and/or the POI data records 708 to associate the speed profile data records with specific places, POIs, geographic areas, and/or other map features. In this way, the linearized data records can also be associated with the characteristics or metadata of the corresponding records 704, 706, and/or 708.

In one embodiment, as discussed above, the HD mapping data records 712 model road surfaces and other map features to centimeter-level or better accuracy. The HD mapping data records 712 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 712 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 712 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 712.

In one embodiment, the HD mapping data records 712 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 114 can be maintained by the content provider 110 in association with the mapping platform 102 (e.g., a map developer or service provider). The map developer can collect geographic data to generate and enhance the geographic database 114. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 114 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicle and/or the UE 106. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for generation of the artificial shadow data 312a for training of the ML model 108 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 is a diagram of hardware that can be used to implement an embodiment. Computer system 800 is programmed (e.g., via computer program code or instructions) for generation of the artificial shadow data 312 a for training of the ML model 108 as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, and sub-atomic. For example, north and south magnetic fields, or a zero and non-zero electric voltage, represent two states (0, 1) of a binary digit (bit). Other phenomena can represent digits of a higher base. A sequence of one or more digits constitutes digital data that is used to represent a number or code for a character. In some embodiments, information called analog data is represented by a near continuum of measurable values within a particular range.

The bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to generation of the artificial shadow data 312 a for training of the ML model 108. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, or chemical components, among others, alone or in combination.

The computer system 800 also includes a memory 804 coupled to bus 810. The memory 804, such as a random access memory (RAM) or other dynamic storage device, stores information including processor instructions for generation of the artificial shadow data 312a for training of the ML model 108. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, which is not changed by the computer system 800. Some memory is composed of volatile storage that loses the information stored thereon when power is lost. Also coupled to the bus 810 is a non-volatile (persistent) storage device 808, such as a magnetic disk, optical disk, or flash card, for storing information, including instructions, which persists even when the computer system 800 is turned off or otherwise loses power.

Information, including instructions for generation of the artificial shadow data 312a for training of the ML model 108, is provided to the bus 910 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 818, is coupled to the bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 800 also includes one or more instances of a communications interface 820 coupled to bus 810. The communication interface 820 provides a one-way or two-way communication coupling to a variety of external devices that operate with their own processors, such as printers, scanners, and external disks. In general, the coupling is with a network link 822 that is connected to a local network 824 to which a variety of external devices with their own processors are connected. For example, the communication interface 820 may be a parallel port or a serial port or a universal serial bus (USB) port on a personal computer. In some embodiments, communications interface 820 is an integrated services digital network (ISDN) card or a digital subscriber line (DSL) card or a telephone modem that provides an information communication connection to a corresponding type of telephone line. In some embodiments, the communication interface 820 is a cable modem that converts signals on the bus 810 into signals for a communication connection over a coaxial cable or into optical signals for a communication connection over a fiber optic cable. As another example, communications interface 820 may be a local area network (LAN) card to provide a data communication connection to a compatible LAN, such as Ethernet. Wireless links may also be implemented. For wireless links, the communications interface 820 sends or receives or both sends and receives electrical, acoustic, or electromagnetic signals, including infrared and optical signals, which carry information streams, such as digital data. For example, in wireless handheld devices, such as mobile telephones like cell phones, the communications interface 820 includes a radio band electromagnetic transmitter and receiver called a radio transceiver. In certain embodiments, the communications interface 820 enables connection to the communication network 126 for generation of the artificial shadow data 312*a* for training of the ML model 108.

The term computer-readable medium is used herein to refer to any medium that participates in providing information to processor 802, including instructions for execution. Such a medium may take many forms, including, but not limited to, non-volatile media, volatile media, and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 822 typically provides information communication using transmission media through one or more networks to other devices that use or process the information. For example, the network link 822 may provide a connection through local network 824 to a host computer 826 or to equipment 828 operated by an Internet Service Provider (ISP). ISP equipment 828 in turn provides data communication services through the public, world-wide packet-switching communication network of networks now commonly referred to as the Internet 830.

A computer called a server host 832 connected to the Internet hosts a process that provides a service in response to information received over the Internet. For example, server host 832 hosts a process that provides information representing video data for presentation at display 814. It is contemplated that the components of system can be deployed in various configurations within other computer systems, e.g., host 826 and server 832.

FIG. 9 is a diagram of a chip set 900 that can be used to implement an embodiment. The chip set 900 is programmed to generate the artificial shadow data 312*a* to train the ML model 108 as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 902 for passing information among the components of the chip set 900. A processor 904 has connectivity to the bus 902 to execute instructions and process information stored in, for example, a memory 906. The processor 904 may include one or more processing cores with each core configured to perform independently. A multi-core processor enables multiprocessing within a single physical package. Examples of a multi-core processor include two, four, eight, or greater numbers of processing cores. Alternatively or in addition, the processor 904 may include one or more microprocessors configured in tandem via the bus 902 to enable independent execution of instructions, pipelining, and multithreading. The processor 904 may also be accompanied with one or more specialized components to perform certain processing functions and tasks such as one or more digital signal processors (DSP) 908, or one or more application-specific integrated circuits (ASIC) 910. A DSP 908 typically is configured to process real-world signals (e.g., sound) in real time independently of the processor 904. Similarly, an ASIC 910 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 904 and accompanying components have connectivity to the memory 906 via the bus 902. The memory 906 includes both dynamic memory (e.g., RAM, magnetic disk, writable optical disk, etc.) and static memory (e.g., ROM, CD-ROM, etc.) for storing executable instructions that when executed perform the inventive steps described herein to generate the artificial shadow data 312*a* to train the ML model 108. The memory 906 also stores the data associated with or generated by the execution of the inventive steps.

Figure 10:
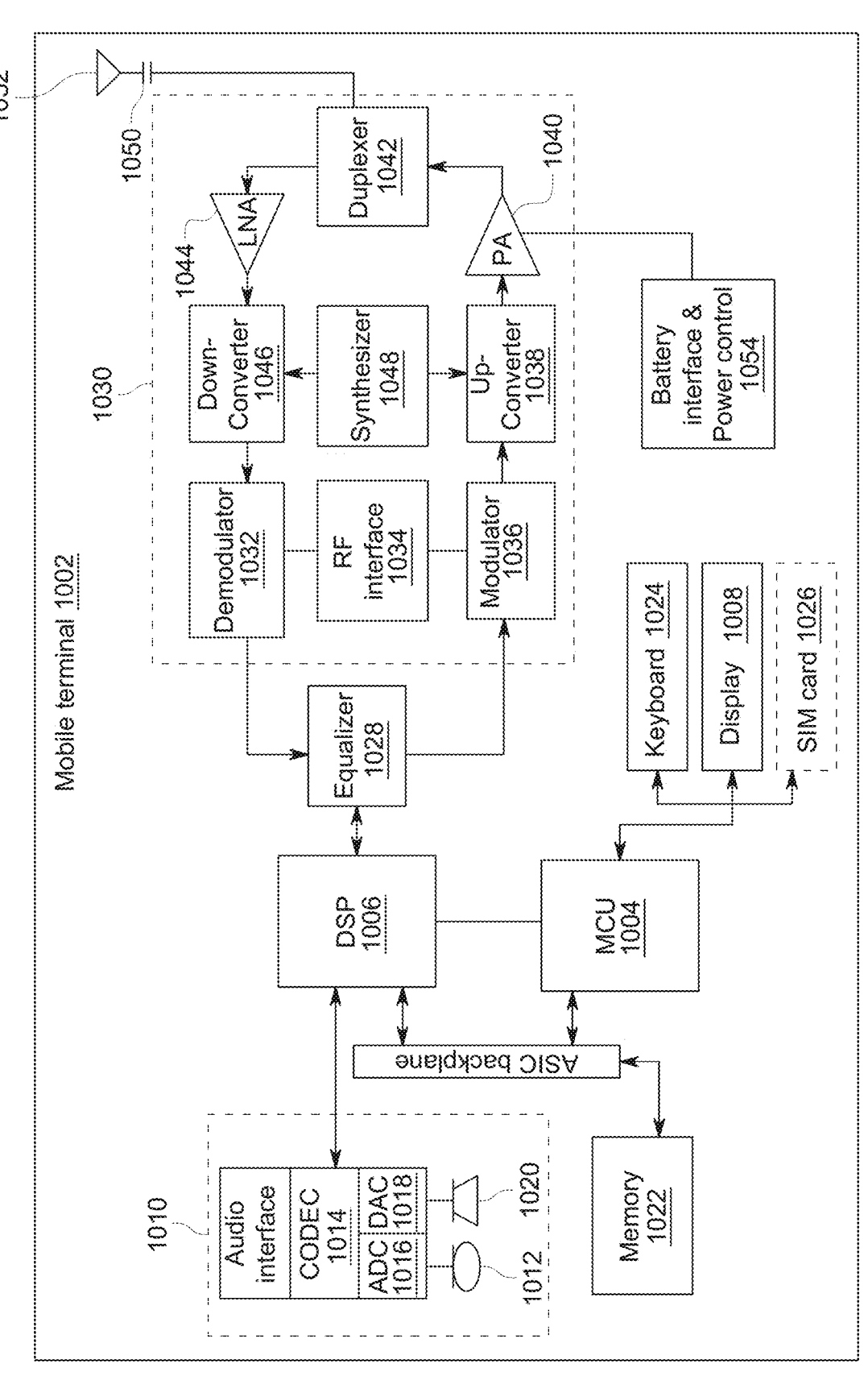
FIG. 10 is a diagram of a mobile terminal (e.g., handset, vehicle, or part thereof) that can be used to implement an embodiment.

FIG. 10 is a diagram of a mobile terminal 1002 (e.g., handset, vehicle, or part thereof) that can be used to implement an embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1004, a Digital Signal Processor (DSP) 1006, and a receiver/transmitter unit including a microphone gain control unit and a speaker gain control unit. A main display unit 1008 provides a display to the user in support of various applications and mobile station functions that offer automatic contact matching. An audio function circuitry 1010 includes a microphone 1012 and microphone amplifier that amplifies the speech signal output from the microphone 1012. The amplified speech signal output from the microphone 1012 is fed to a coder/decoder (CODEC) 1014.

A radio section 1030 amplifies power and converts frequency in order to communicate with a base station, which is included in a mobile communication system, via antenna 1052. The power amplifier (PA) 1040 and the transmitter/modulation circuitry are operationally responsive to the MCU 1004, with an output from the PA 1040 coupled to the duplexer 1042 or circulator or antenna switch, as known in the art. The PA 1040 also couples to a battery interface and power control unit 1054.

In use, a user of mobile station 1002 speaks into the microphone 1012 and his or her voice along with any detected background noise is converted into an analog voltage. The analog voltage is then converted into a digital signal through the Analog to Digital Converter (ADC) 1016. The control unit 1004 routes the digital signal into the DSP 1006 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like. The encoded signals are then routed to an equalizer 1028 for compensation of any frequency-dependent impairments that occur during transmission though the air such as phase and amplitude distortion. After equalizing the bit stream, the modulator 1036 combines the signal with a RF signal generated in the RF interface 1034. The modulator 1036 generates a sine wave by way of frequency or phase modulation. In order to prepare the signal for transmission, an up-converter 1038 combines the sine wave output from the modulator 1036 with another sine wave generated by a synthesizer 1048 to achieve the desired frequency of transmission. The signal is then sent through a PA 1040 to increase the signal to an appropriate power level. In practical systems, the PA 1040 acts as a variable gain amplifier whose gain is controlled by the DSP 1006 from information received from a network base station. The signal is then filtered within the duplexer 1042 and optionally sent to an antenna coupler 1050 to match impedances to provide maximum power transfer. Finally, the signal is transmitted via antenna 1052 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1002 are received via antenna 1052 and immediately amplified by a low noise amplifier (LNA) 1044. A down-converter 1046 lowers the carrier frequency while the demodulator 1032 strips away the RF leaving only a digital bit stream. The signal then goes through the equalizer 1028 and is processed by the DSP 1006. A Digital to Analog Converter (DAC) 1018 converts the signal and the resulting output is transmitted to the user through the speaker 1020, all under control of a Main Control Unit (MCU) 1004—which can be implemented as a Central Processing Unit (CPU) (not shown).

The MCU 1004 receives various signals including input signals from the keyboard 1024. The keyboard 1024 and/or the MCU 1004 in combination with other user input components (e.g., the microphone 1012) comprise a user interface circuitry for managing user input. The MCU 1004 runs a user interface software to facilitate user control of at least some functions of the mobile station 1002 for generation of the artificial shadow data 312*a* for training of the ML model 108. The MCU 1004 also delivers a display command and a switch command to the display 1008 and to the speech output switching controller, respectively. Further, the MCU 1004 exchanges information with the DSP 1006 and can access an optionally incorporated SIM card 1026 and a memory 1022. In addition, the MCU 1004 executes various control functions required of the station. The DSP 1006 may, depending upon the implementation, perform any of a variety of conventional digital processing functions on the voice signals. Additionally, DSP 1006 determines the background noise level of the local environment from the signals detected by microphone 1012 and sets the gain of microphone 1012 to a level selected to compensate for the natural tendency of the user of the mobile station 1002.

The CODEC 1014 includes the ADC 1016 and DAC 1018. The memory 1022 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1022 may be, but not limited to, a single memory, CD, DVD, ROM, RAM, EEPROM, optical storage, or any other non-volatile or non-transitory storage medium capable of storing digital data.

An optionally incorporated SIM card 1026 carries, for instance, important information, such as the cellular phone number, the carrier supplying service, subscription details, and security information. The SIM card 1026 serves primarily to identify the mobile station 1002 on a radio network. The card 1026 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system for detecting road features, the system comprising:

at least one processor; and at least one memory including computer program code for one or more programs, the at least one memory and the computer program code configured to, with the at least one processor, cause the system to perform at least the following:

receive image data associated with one or more road features, wherein the received image data is associated with ground truth label data corresponding to the one or more road features;

determine a set of shadowed regions from one or more images of the received image data;

generate artificial shadow data based on a set of shadow characteristics of the determined set of shadowed regions, wherein to generate the artificial shadow data, the system is caused to perform determination of random shapes of shadows based on a Bezier curve;

augment the image data with the generated artificial shadow data by applying the generated artificial shadow data to the received image data; and train a machine learning (ML) model based on the augmented image data and ground truth label data, wherein the ML model is trained to detect the one or more road features.

2. The system of claim 1, wherein the image data associated with the one or more road features comprises at least one overhead view image obtained from an imaging device on board of one at least one of: a satellite, an airplane, or an unmanned aerial vehicle.

3. The system of claim 1, wherein the image data comprises at least one of: a visible light imagery, an infrared imagery, a radio detection and ranging (RADAR) imagery, a multispectral imagery, a hyperspectral imagery, or a combination thereof.

4. The system of claim 1, wherein to generate the artificial shadow data, the system is caused to perform segmenting of the set of shadowed regions in the one or more images from non-shadowed regions in the one or more images.

5. The system of claim 4, wherein the system is caused to perform the segmenting of the set of shadowed regions in the one or more images based on a multi-color-space thresholding technique.

6. The system of claim 4, wherein the system is caused to perform the segmenting of the set of shadowed regions in the one or more images based on application of a segmentation ML model on the one or more images, and wherein the segmentation ML model is trained based on at least one of: an instance segmentation technique or a semantic segmentation technique.

7. The system of claim 4, wherein the system is caused to perform the segmenting of the set of shadowed regions in the one or more images based on one of: a mean shift segmentation technique, a watershed segmentation technique, or a region growing segmentation technique.

8. The system of claim 1, wherein the set of shadow characteristics is obtained via spectral transformation of the set of shadowed regions, and wherein the spectral transformation is performed by at least one of: a principal component analysis (PCA) technique, a minimum noise fraction (MNF) technique, or an independent component analysis (ICA) technique.

9. The system of claim 1, wherein the set of shadow characteristics represents a color profile of the set of shadowed regions in at least one of: a hue saturation value (HSV) color space, or a red green blue (RGB) color space.

10. The system of claim 1, wherein to generate the artificial shadow data, the system is caused to perform at least determination of texture information of the set of shadowed regions based on elimination of pixel data of objects in the set of shadowed regions from noisy background data associated with the set of shadowed regions.

11. The system of claim 10, wherein to generate the artificial shadow data, the system is caused to perform at least determination of the texture information of the set of shadowed regions based on a denoising kernel.

12. The system of claim 1, wherein to generate the artificial shadow data, the system is caused to perform at least combining of: a set of shadow characteristics of the set of shadowed regions, texture information of the set of shadowed regions, and random shapes of shadows.

13. A method for detecting one or more road features, comprising:

receiving a first image associated with the one or more road features;

detecting the one or more road features based on providing the received first image to a machine learning (ML) model trained at least in part on image data and artificial shadow data, wherein random shapes of shadows are determined based on a Bezier curve to generate the artificial shadow data;

generating an output for the detected one or more road features included in the received first image; and updating a map database based on the generated output.

14. The method of claim 13, wherein the first image associated with the one or more road features comprises at least one overhead view image obtained from an imaging device on board of one at least one of: a satellite, an airplane, or an unmanned aerial vehicle.

15. The method of claim 13, wherein the artificial shadow data is generated based on a set of shadowed regions of the image data.

16. The method of claim 15, wherein the set of shadowed regions are obtained via segmentation of the set of shadowed regions from non-shadowed regions in the image data, to generate the artificial shadow data.

17. The method of claim 16, wherein the segmenting of the set of shadowed regions in the image data is based on a multi-color-space thresholding technology.

18. A non-transitory computer-readable storage medium carrying one or more sequences of one or more instructions which, when executed by one or more processors, cause an apparatus to perform operations comprising:

receiving image data associated with one or more road features;

determining a set of shadowed regions from one or more images of the received image data;

segmenting the set of shadowed regions in the one or more images of the received image data from non-shadowed regions in the one or more images;

processing the set of shadowed regions to obtain a set of shadow characteristics associated with the set of shadowed regions;

processing the set of shadowed regions to determine texture information of the set of shadowed regions;

determining random shapes of shadows based on a Bezier curve;

generating artificial shadow data based on combination of the obtained set of shadow characteristics of the set of shadowed regions, the determined texture information of the set of shadowed regions, and the determined random shapes of shadows; and augmenting the image data to train a machine learning (ML) model based on the generated artificial shadow data.

\* \* \* \* \*